US012347523B2

(12) United States Patent
Guo

(10) Patent No.: US 12,347,523 B2
(45) Date of Patent: Jul. 1, 2025

(54) HEIGHT-ADJUSTABLE DESK-TYPE ELECTRIC PIANO

(71) Applicant: Jinjiang Hexiangsheng Electronic Technology Co., Ltd., Fujian (CN)

(72) Inventor: Xiuling Guo, Fujian (CN)

( * ) Notice: Subject to any disclaimer, the term of this patent is extended or adjusted under 35 U.S.C. 154(b) by 282 days.

(21) Appl. No.: 18/123,934

(22) Filed: Mar. 20, 2023

(65) Prior Publication Data

US 2024/0321385 A1 Sep. 26, 2024

(51) Int. Cl.
*G12B 9/10* (2006.01)
*G10C 3/02* (2006.01)

(52) U.S. Cl.
CPC .................................... *G12B 9/10* (2013.01); *G10C 3/02* (2013.01)

(58) Field of Classification Search
CPC ........................................................ G12B 9/10
See application file for complete search history.

(56) References Cited

U.S. PATENT DOCUMENTS

| | | | | | |
|---|---|---|---|---|---|
| 1,066,518 | A * | 7/1913 | Nickol et al. | G07G 1/0027 | 235/22 |
| 1,728,815 | A * | 9/1929 | Waddington | G10C 3/02 | 84/180 |
| 3,259,081 | A * | 7/1966 | Stalnacke | A47B 9/04 | 108/106 |
| 4,542,810 | A * | 9/1985 | Shimbara | G11B 33/08 | 188/290 |
| 4,586,761 | A * | 5/1986 | Shimbara | G11B 33/02 | 312/319.1 |
| 4,714,025 | A * | 12/1987 | Wallin | A47B 9/00 | 340/870.38 |
| 4,828,344 | A * | 5/1989 | Omata | A47B 88/467 | 312/319.1 |
| 7,086,632 | B2 * | 8/2006 | Hsieh | G10H 1/32 | 248/163.1 |
| 7,612,274 | B2 * | 11/2009 | Nakata | G10C 3/02 | 84/423 R |
| 7,908,981 | B2 * | 3/2011 | Agee | A47B 9/04 | 248/188.4 |
| 10,588,401 | B1 * | 3/2020 | Lu | A47B 9/04 | |
| 11,166,546 | B2 * | 11/2021 | Lin | A47B 9/04 | |
| D943,317 | S * | 2/2022 | Lin | D6/656.17 | |
| 2005/0121564 | A1 * | 6/2005 | Johnson | F16M 11/18 | 248/125.1 |
| 2024/0321385 | A1 * | 9/2024 | Guo | A47B 21/02 | |

FOREIGN PATENT DOCUMENTS

| | | | | |
|---|---|---|---|---|
| CN | 112530385 A | * | 3/2021 | G09B 15/00 |
| CN | 114203132 A | * | 3/2022 | |

* cited by examiner

*Primary Examiner* — Robert W Horn

(57) ABSTRACT

A height-adjustable desk-type electric piano is composed of a bracket body and a desk-type keyboard assembly installed on the bracket body, and an adjustment device for the lifting adjustment of the bracket body is arranged on the bracket body; the desk-type keyboard assembly comprises a desk top and a piano keyboard, and the piano keyboard is drawer-connected in the desk top, which can be extended and retracted; in the piano frame of the electric piano of the invention, the threaded rod is driven to screw in or out in the sleeve rod through gear transmission, thereby forcing the inner rods to perform telescopic movement in the outer rods, and then realizes the lifting adjustment of the piano frame, which can satisfy people of different heights use, and it is integrated with the structure of the desk, so that it can be used as an electric piano or as a desk.

4 Claims, 8 Drawing Sheets

HEIGHT-ADJUSTABLE DESK-TYPE ELECTRIC PIANO

1. TECHNICAL FIELD

The invention relates to the technical field of musical instruments, in particular to a height-adjustable desk-type electric piano.

2. BACKGROUND ART

With the continuous improvement of living standards, pianos have become more and more common in ordinary families, especially in recent years, the development of electric pianos is very fast; in order to be simple and suitable for transportation, the electric piano keyboard is usually installed on a support frame for use, and the support frame is usually set to H-type or X-type; because the height of the current support frame is fixed, the height of the normal fixed support frame cannot meet the needs of young or tall people.

On the one hand, the technical research and development of this application is aimed at the piano frame of the electric piano currently on the market, its height is fixed by integral installation, that is, once the height of the piano frame is installed, the overall height of the electric piano is fixed, which has a defect in use: when it is used by children of different heights or adults, the overall height of the electric piano is fixed, and the height of the piano frame cannot be adjusted with the height of the user, therefore, when children use it, in order to cater to the fixed height of the electric piano, either the piano stool is too high, so that the feet cannot reach the ground, or the piano stool is too short, and the hands cannot reach the keyboard; on the other hand, all the current electric pianos cannot be integrated with the desk, the invention solves the problem that the electric piano is only used and put as a musical instrument.

3. SUMMARY OF THE INVENTION

The object of the invention is to overcome the deficiencies of the existing technology and provide an electric piano with a reasonable design, which can be adjusted according to the user's height requirements and can also be used as a desk.

The invention is realized through the following technical scheme: a height-adjustable desk-type electric piano, it is composed of a bracket body and a desk-type keyboard assembly installed on the bracket body, and an adjustment device for the lifting adjustment of the bracket body is arranged on the bracket body;

The desk-type keyboard assembly comprises a desk top and a piano keyboard, and the piano keyboard is drawer-connected in the desk top, which can be extended and retracted.

The adjustment device is a screw adjustment device, the screw adjustment device comprises the hand wheel, the rotating rod rotatably connected to the hand wheel, the disc gear fixed on the rotating rod, the sleeve rod, the threaded rod sleeved in the sleeve rod and in threaded connection with it, the threaded rod is screwed in and out of the sleeve rod.

The top of the threaded rod is provided with a vertical gear, the vertical gear and the disk gear are meshed and connected to each other for transmission.

The bracket body includes the support rod assemblies symmetrically arranged on the left and right, and the support rod assemblies are telescopic sleeve rods, the sleeve rod and threaded rod in the screw adjustment device are installed in the telescopic sleeve rod, and the rotating rod spans the top of the two support rod assemblies; the threaded rod is screwed in and out of the sleeve rod, which drives the telescopic sleeve rods to extend or shorten.

The invention has the following advantages: compared with the prior art, in the piano frame of the electric piano of the invention, the threaded rod is driven to screw in or out in the sleeve rod through gear transmission, thereby forcing the inner rods to perform telescopic movement in the outer rods, and then realizes the lifting adjustment of the piano frame, which can satisfy people of different heights use, and it is integrated with the structure of the desk, so that it can be used as an electric piano or as a desk.

4. BRIEF DESCRIPTION OF ACCOMPANY DRAWINGS

The invention is described in detail in combination with the accompanying drawings.

Figure 1:
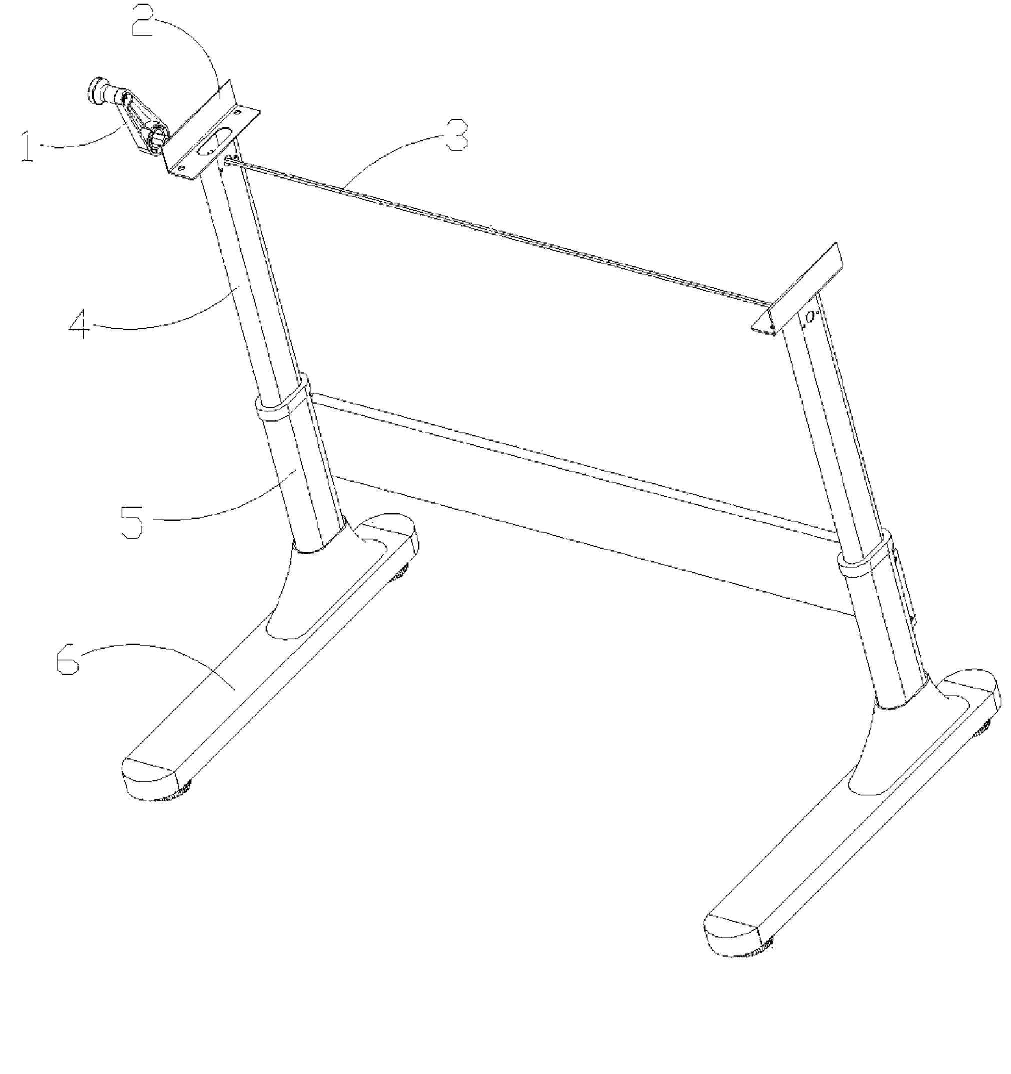
FIG. 1 is a schematic diagram of a bracket body of the invention.
Figure 2:
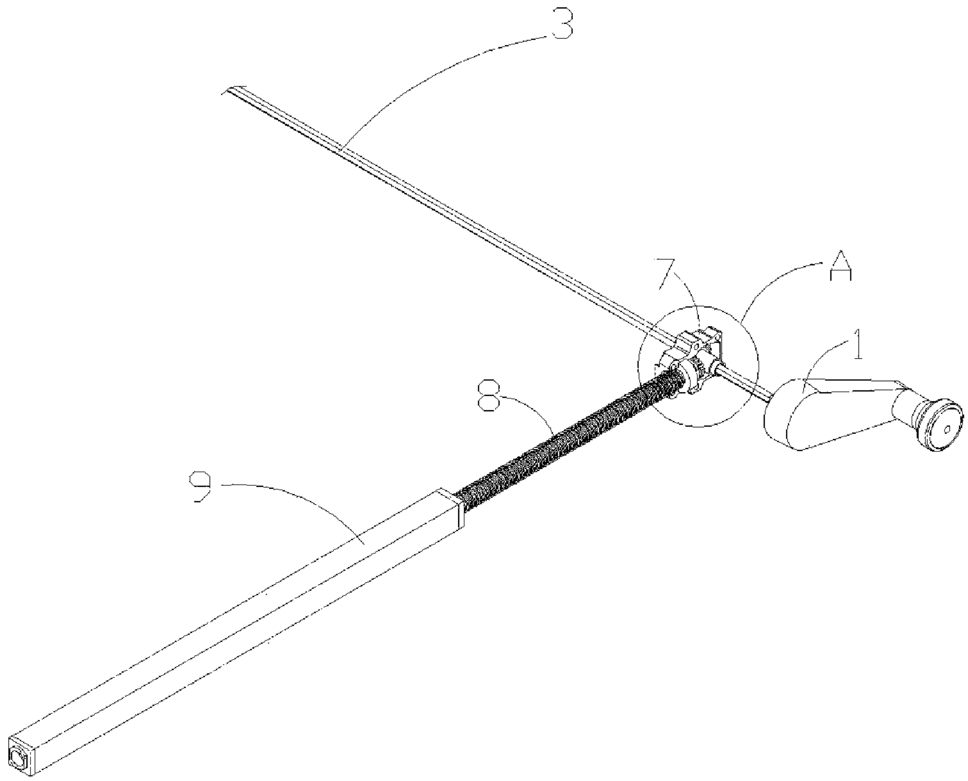
FIG. 2 is a schematic diagram of the screw adjustment device of the invention.

As shown in the accompanying drawings: 1 hand wheel; 2 angle iron; 3 rotating rod; 4 inner rod; 5 outer rod; 6 fixing rod; 7 gear housing; 8 threaded rod, 9 sleeve rod; 10 disk gear; 11 vertical gear; 12 desk top; 13 piano keyboard.

5. SPECIFIC EMBODIMENT OF THE INVENTION

The technical schemes in the embodiments of the invention will be clearly and completely described below in combination with the accompanying drawings in the embodiments of the invention, obviously, the described embodiments are only part of the embodiments of the invention, not all of them.

Embodiment 1, referring to FIG. 1-5, a height-adjustable desk-type electric piano, it is composed of a bracket body and a desk-type keyboard assembly installed on the bracket body, and an adjustment device for the lifting adjustment of the bracket body is arranged on the bracket body;

The desk-type keyboard assembly comprises a desk top 12 and a piano keyboard 13, and the piano keyboard 13 is drawer-connected in the desk top 12, which can be extended and retracted. The piano keyboard 13 is the keyboard of an electric piano or an electronic piano. In order not to affect the plane use of the desk top, a music stand can be arranged on the desk top as required.

The bracket body includes the telescopic sleeve rods symmetrically arranged on the left and right, specifically the inner rods 4 and the outer rods 5, the inner rods 4 are sleeved into the outer rods 5, an adjustment device for the lifting adjustment of the bracket body is arranged on the bracket body;

The screw adjustment device comprises the hand wheel 1, the rotating rod 3 rotatably connected to the hand wheel 1, the disc gear 10 fixed on the rotating rod 3, the sleeve rod 9, the threaded rod 8 sleeved in the sleeve rod 9 and in threaded connection with it, the threaded rod 8 is screwed in and out of the sleeve rod 9.

Figure 4:
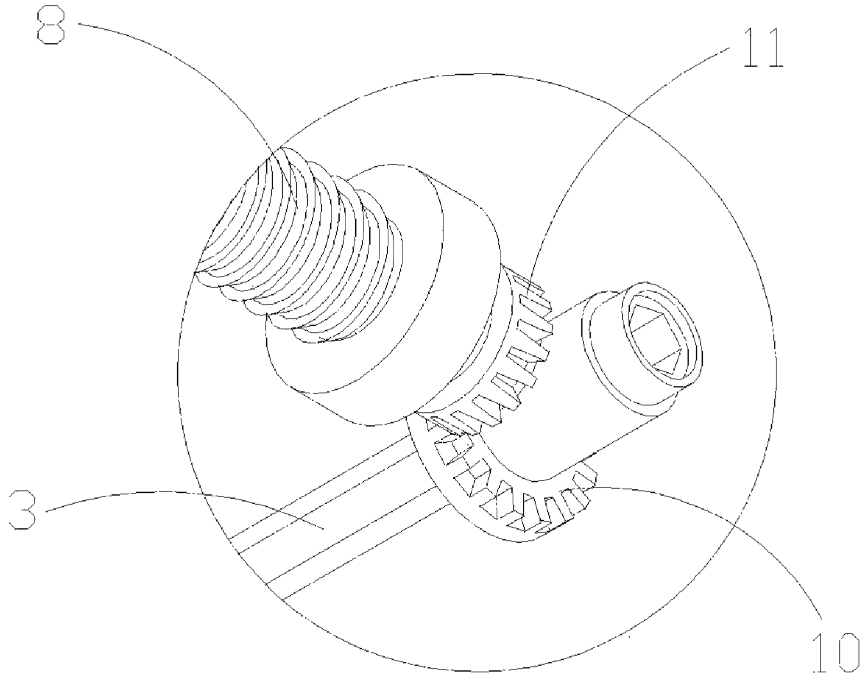
FIG. 4 is a schematic diagram of the meshing state of the gears in the invention.

As shown in FIG. 4, the disc gear 10 is installed in the gear housing 7, and the number of the gear housings 7 is two, which are respectively fixed on the top of the left and right symmetrical inner rods 4, and the rotating rod 3 passes through the left and right disc gears 10 respectively, the hand wheel 1 is fixed on one end of the rotating rod 3.

Figure 3:
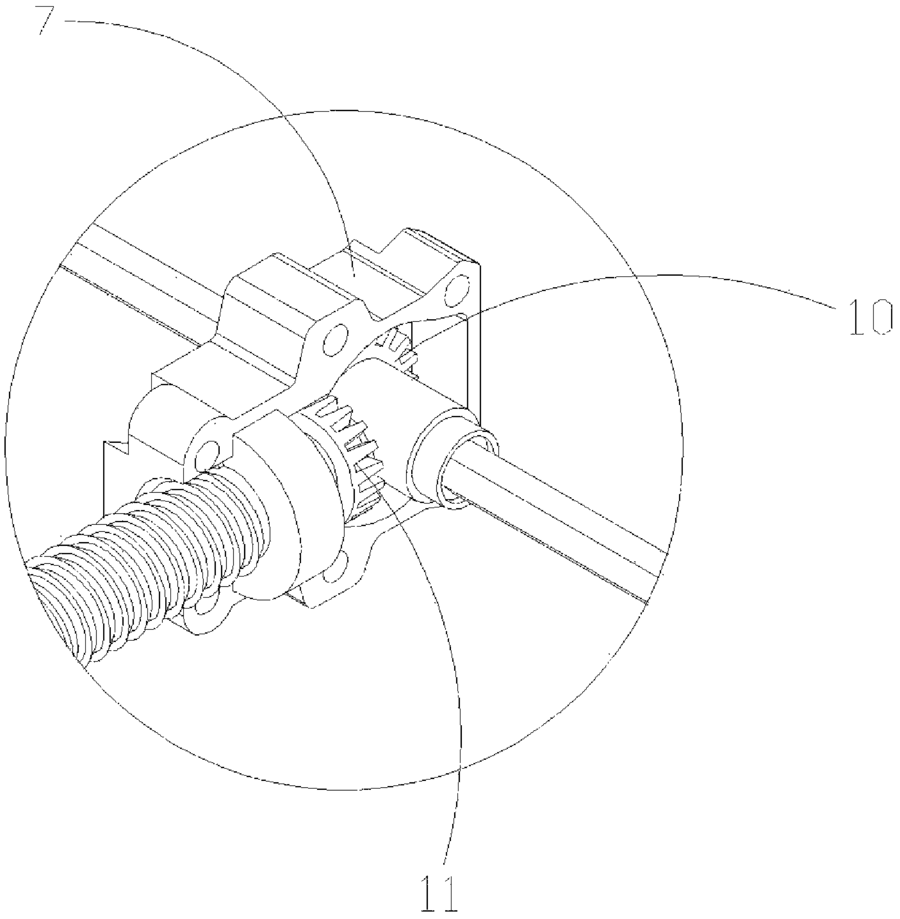
FIG. 3 is an enlarged schematic diagram of A in FIG. 2 of the invention.
Figure 5:
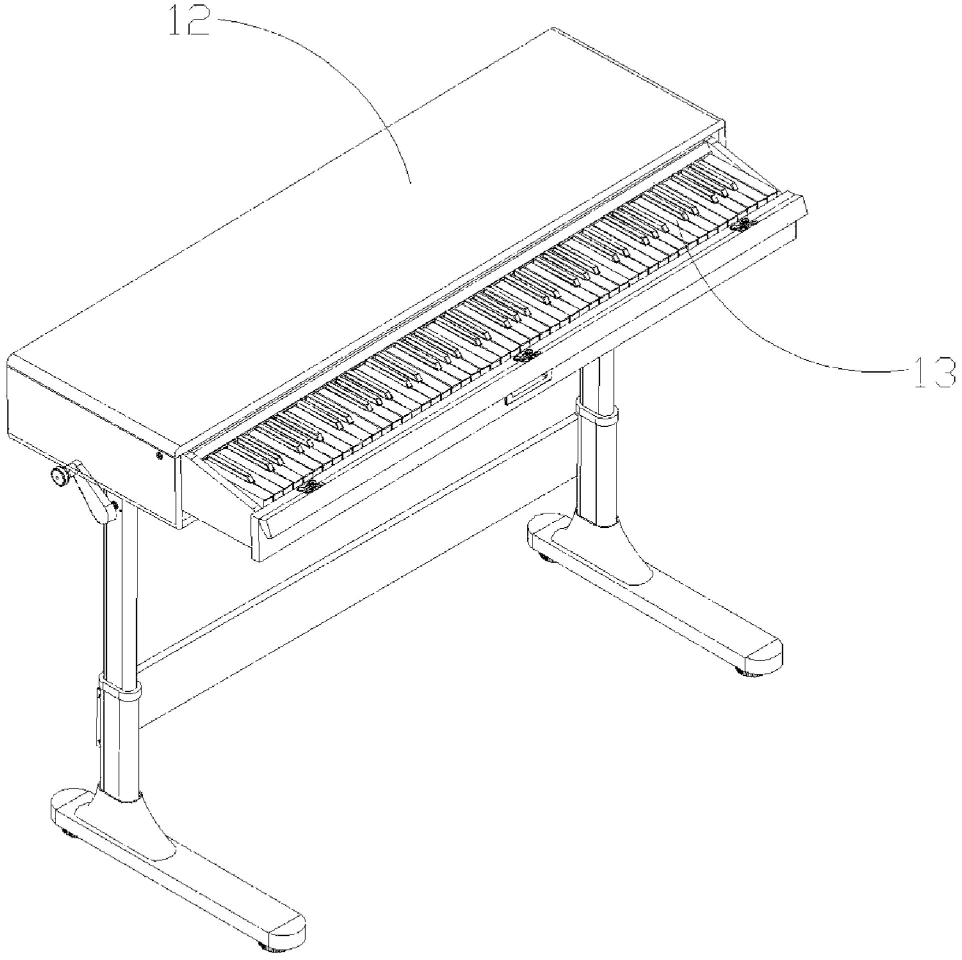
FIG. 5 shows that the height of the invention is adjusted to the high point and the piano keyboard is pulled out.
Figure 6:
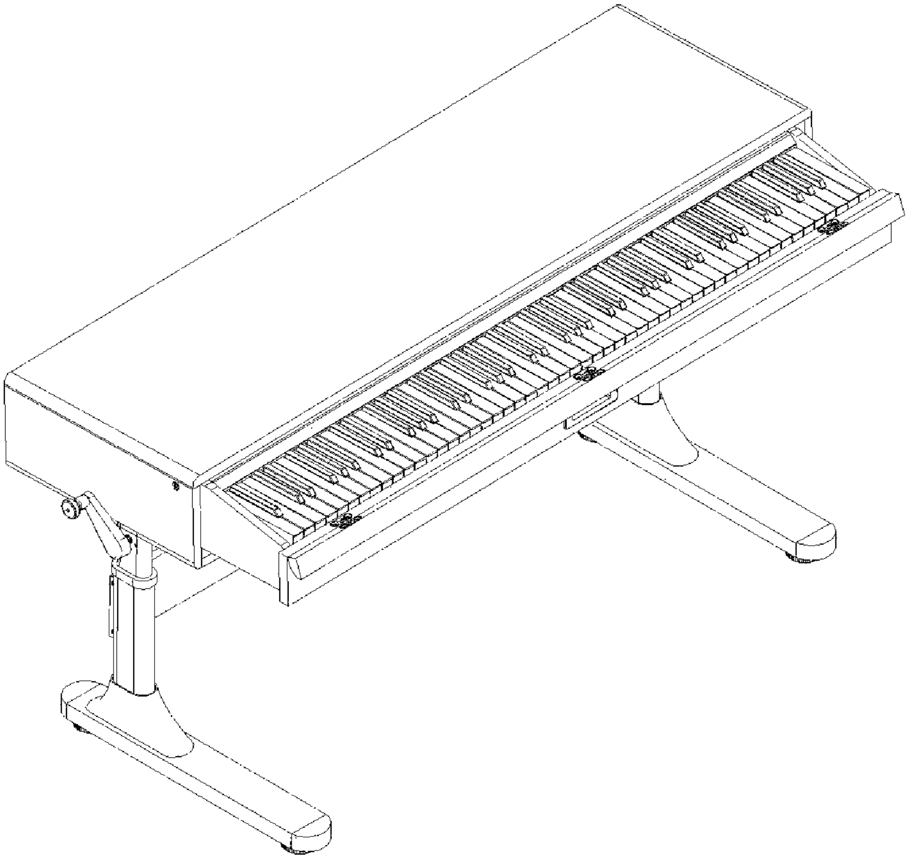
FIG. 6 shows that the height of the invention is adjusted to the low point and the piano keyboard is pulled out.
Figure 7:
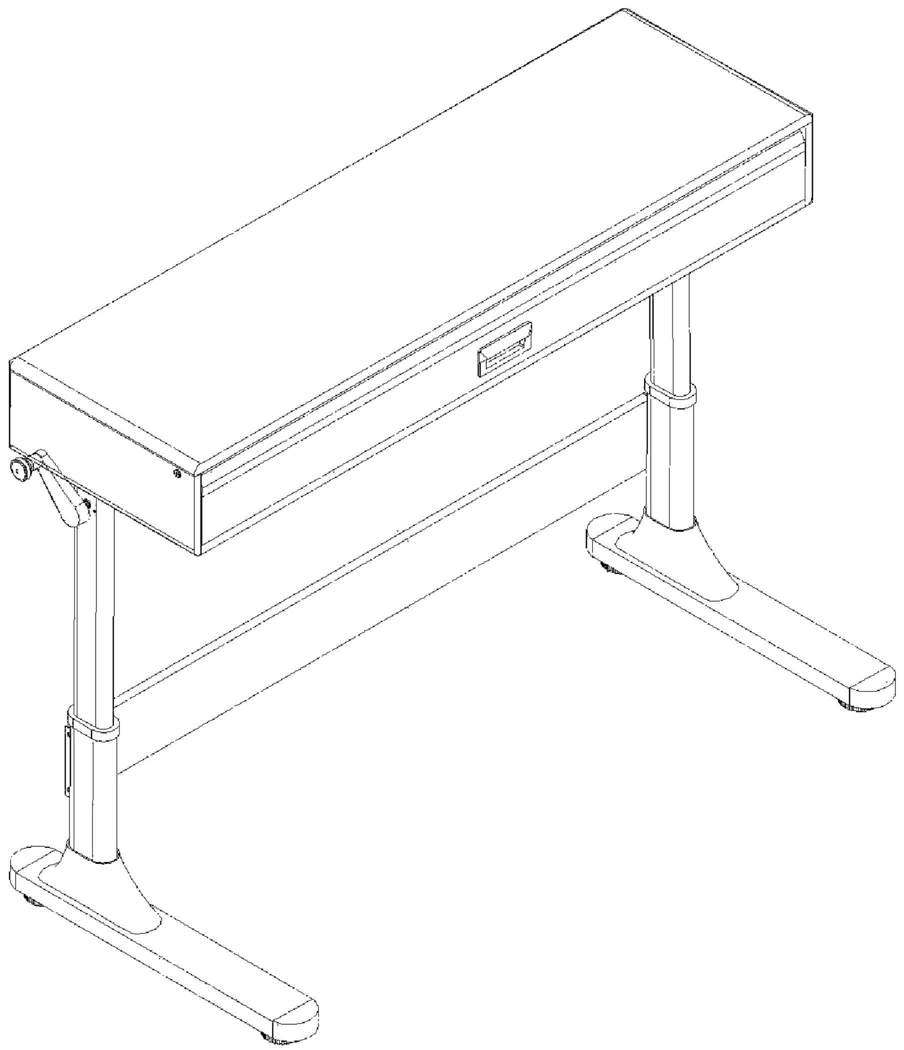
FIG. 7 shows that the height of the invention is adjusted to the high point and the piano keyboard is closed as a desk.
Figure 8:
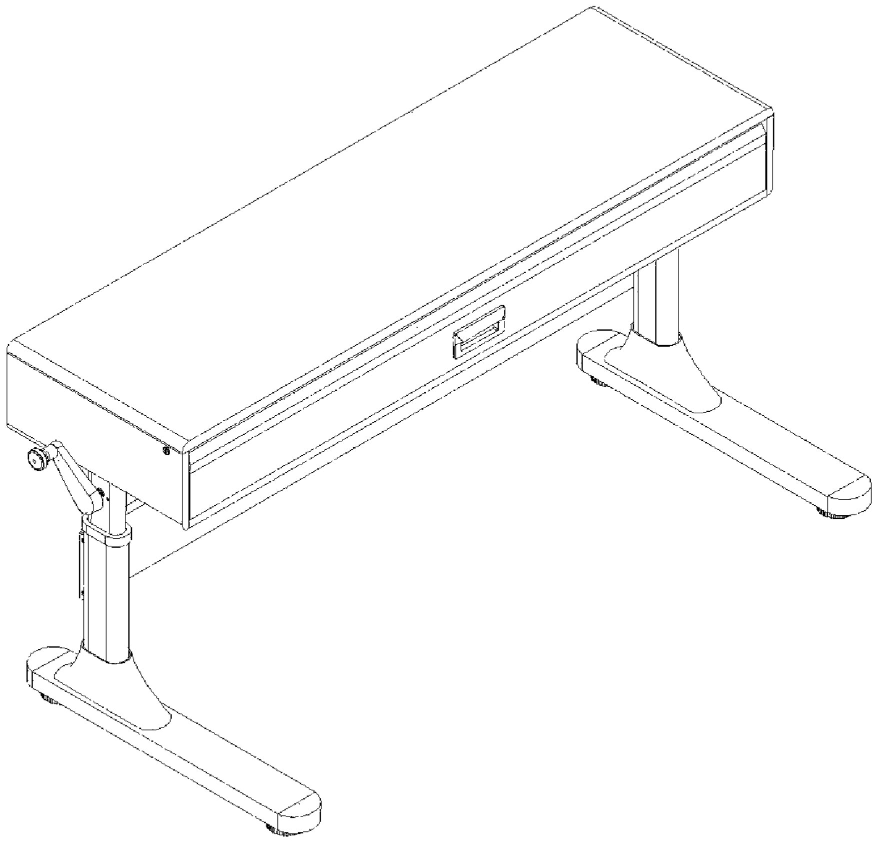
FIG. 8 shows that the height of the invention is adjusted to the low point and the piano keyboard is closed as a desk.

As shown in FIG. 3 and FIG. 4, the top of the threaded rod 8 is provided with a vertical gear 11, the vertical gear 11 and the disk gear 10 are meshed and connected to each other for transmission; the threaded rod 8 is screwed in and out of the sleeve rod 9, the sleeve rod 9 extends into the inside of the inner rod 4, the outer rod 5 and the fixing rod 6; the lower end of the sleeve rod 9 is fixedly installed on the bottom surface of the fixing rod 6; when the hand wheel 1 rotates, it drives the vertical gear 11 and the disc gear 10 to mesh with each other, so that the threaded rod 8 is screwed in or out of the sleeve rod 9, since the lower end of the sleeve rod 9 is fixed, the inner rods 4 are forced to extend or retract in the outer rods 5 to achieve the purpose of lifting and lowering. As shown in FIG. 5 and FIG. 6, turning the hand wheel can adjust the desk-type keyboard assembly to the highest point or the lowest point, and the piano keyboard 13 can be pulled out from the desk top 12 for playing. As shown in FIG. 7 and FIG. 8, closing the piano keyboard 13 and turning the hand wheel can adjust the desk-type keyboard assembly to the highest point or the lowest point, it can be used as a desk.

The outer rods 5 are installed on the fixing rods 6, and the fixing rods 6 are supported on the floor to play a stable role.

In order to make the keyboard of the electric piano or the keyboard of the electronic piano more firmly placed on the piano frame, the L-shaped angle irons 2 are arranged on the top of the inner rods 4.

The invention has a reasonable structural design, the piano frame of the electric piano is provided with the threaded rod 8 and sleeve rod 9 inside the inner rod 4 and the outer rod 5, and the threaded rod 8 is screwed in or out of the sleeve rod 9, and the power for screwing in or out comes from the transmission force generated by manually rotating the hand wheel 1 so that the vertical gear 11 and the disc gear 10 are meshed with each other. After the inner rods 4 rise or fall in the outer rods 5, the keyboard arranged on the top also rises or falls, so as to achieve the object of adjusting the piano frame height of the electric piano.

Of course, the adjustment device can also be a self-locking adjustment of the manual plug-pin type large rod sleeved with small rod.

The invention claimed is:

1. A height-adjustable desk-type electric piano is composed of a bracket body and a desk-type keyboard assembly installed on the bracket body, and an adjustment device for the lifting adjustment of the bracket body is arranged on the bracket body; the desk-type keyboard assembly comprises a desk top and a piano keyboard, and the piano keyboard is drawer-connected in the desk top, which can be extended and retracted.

2. A height-adjustable desk-type electric piano of claim 1, the adjustment device is a screw adjustment device, the screw adjustment device comprises the hand wheel, the rotating rod rotatably connected to the hand wheel, the disc gear fixed on the rotating rod, the sleeve rod, the threaded rod sleeved in the sleeve rod and in threaded connection with it, the threaded rod is screwed in and out of the sleeve rod.

3. A height-adjustable desk-type electric piano of claim 2, the top of the threaded rod is provided with a vertical gear, the vertical gear and the disk gear are meshed and connected to each other for transmission.

4. A height-adjustable desk-type electric piano of claim 1, the bracket body includes the support rod assemblies symmetrically arranged on the left and right, and the support rod assemblies are telescopic sleeve rods, the sleeve rod and threaded rod in the screw adjustment device are installed in the telescopic sleeve rod, and the rotating rod spans the top of the two support rod assemblies; the threaded rod is screwed in and out of the sleeve rod, which drives the telescopic sleeve rods to extend or shorten.

* * * * *